US012705205B2

(12) United States Patent
Glick et al.

(10) Patent No.: US 12,705,205 B2
(45) Date of Patent: Aug. 11, 2026

(54) UNIFIED MANAGEMENT FRAMEWORK FOR MEDIATING ACCESS TO A RECONFIGURABLE PROCESSOR SYSTEM

(71) Applicant: SambaNova Systems, Inc., Palo Alto, CA (US)

(72) Inventors: Benjamin Glick, Palo Alto, CA (US); Neal Sanghvi, Palo Alto, CA (US); Shivam Raikundalia, Palo Alto, CA (US); Conrad Alexander Turlik, Palo Alto, CA (US); Arnav Goel, San Jose, CA (US); Sruthi Veeragandham, Palo Alto, CA (US); Juan Dominguez, Palo Alto, CA (US); Qi Zheng, Fremont, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 428 days.

(21) Appl. No.: 18/529,035

(22) Filed: Dec. 5, 2023

(65) Prior Publication Data

US 2025/0181550 A1 Jun. 5, 2025

(51) Int. Cl.
*G06F 9/46* (2006.01)
*G06F 11/30* (2006.01)
*G06F 15/78* (2006.01)

(52) U.S. Cl.
CPC ...... *G06F 15/7871* (2013.01); *G06F 11/3024* (2013.01)

(58) Field of Classification Search
CPC ......................... G06F 15/7871; G06F 11/3024
See application file for complete search history.

(56) References Cited

U.S. PATENT DOCUMENTS 10,698,853 B1 6/2020 Grohoski et al.
10,768,899 B2 9/2020 Koeplinger et al.
10,831,507 B2 11/2020 Shah et al.
11,055,141 B2 7/2021 Prabhakar et al.
11,080,227 B2 8/2021 Koeplinger et al.
11,126,574 B1 9/2021 Prabhakar et al.
11,150,872 B2 10/2021 Wang et al.
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Gregory A Kessler
(74) *Attorney, Agent, or Firm* — FP; Joachim Erhard Pistorius; Sikander M. Khan

(57) ABSTRACT

A unified management framework for mediating access to an entity that interacts with a reconfigurable processor is presented. Furthermore, a system is presented that includes a reconfigurable processor configured to execute a dataflow graph, an entity that provisions and deprovisions the dataflow graph on the reconfigurable processor and that controls execution of the dataflow graph on the reconfigurable processor, and a unified management framework for mediating access to the entity and to the reconfigurable processor. Moreover, a method of operating a unified management framework for mediating access to an entity that interacts with a reconfigurable processor is presented.

20 Claims, 9 Drawing Sheets

WITH A CONFIGURATION TOOL, CONTROL ACCESS TO THE ENTITY FOR PROVISIONING AND DEPROVISIONING OF A DATAFLOW GRAPH ON THE RECONFIGURABLE PROCESSOR

910

WITH AN ORCHESTRATION TOOL, CONTROL ACCESS TO THE ENTITY FOR CONTROLLING EXECUTION OF THE DATAFLOW GRAPH ON THE RECONFIGURABLE PROCESSOR

920

WITH A MONITORING TOOL, CONTROL ACCESS TO THE ENTITY FOR MONITORING THE ENTITY AND THE RECONFIGURABLE PROCESSOR IN CONNECTION WITH THE EXECUTION OF THE DATAFLOW GRAPH ON THE RECONFIGURABLE PROCESSOR

930

(56) References Cited

U.S. PATENT DOCUMENTS

| | | | |
|---|---|---|---|
| 11,182,221 | B1 | 11/2021 | Sivaramakrishnan et al. |
| 11,182,264 | B1 | 11/2021 | Sivaramakrishnan et al. |
| 11,188,497 | B2 | 11/2021 | Shah et al. |
| 11,191,182 | B1 | 11/2021 | Wilson et al. |
| 11,195,080 | B1 | 12/2021 | Nama et al. |
| 11,200,096 | B1 | 12/2021 | Shenbagam et al. |
| 11,204,889 | B1 | 12/2021 | Prabhakar et al. |
| 11,227,207 | B1 | 1/2022 | Nama et al. |
| 11,232,360 | B1 | 1/2022 | Nama et al. |
| 11,237,880 | B1 | 2/2022 | Raumann et al. |
| 11,237,971 | B1 | 2/2022 | Brown et al. |
| 11,239,846 | B1 | 2/2022 | ur Rahman et al. |
| 11,250,061 | B1 | 2/2022 | Nama et al. |
| 11,250,105 | B2 | 2/2022 | Wang et al. |
| 11,256,987 | B1 | 2/2022 | Terakanambi Sheshadri et al. |
| 11,263,170 | B1 | 3/2022 | Nama et al. |
| 11,290,113 | B1 | 3/2022 | ur Rahman et al. |
| 11,290,114 | B1 | 3/2022 | ur Rahman et al. |
| 11,323,124 | B1 | 5/2022 | ur Rahman et al. |
| 11,327,713 | B2 | 5/2022 | Wang et al. |
| 11,327,717 | B2 | 5/2022 | Wang et al. |
| 11,327,771 | B1 | 5/2022 | Grohoski et al. |
| 11,327,923 | B2 | 5/2022 | Wang et al. |
| 11,328,038 | B2 | 5/2022 | Wang et al. |
| 11,328,209 | B1 | 5/2022 | Terakanambi Sheshadri et al. |
| 11,334,109 | B1 | 5/2022 | ur Rahman et al. |
| 11,366,783 | B1 | 6/2022 | Prabhakar et al. |
| 11,386,038 | B2 | 7/2022 | Prabhakar et al. |
| 11,392,740 | B2 | 7/2022 | Raumann et al. |
| 11,409,540 | B1 | 8/2022 | Grohoski et al. |
| 11,410,027 | B2 | 8/2022 | Chen et al. |
| 11,429,349 | B1 | 8/2022 | Oklobdzija et al. |
| 11,487,694 | B1 | 11/2022 | Misra et al. |
| 11,556,494 | B1 | 1/2023 | Grohoski et al. |

OTHER PUBLICATIONS

List of Related Cases, dated Jun. 6, 2024, 2 pages.

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/ MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

UNIFIED MANAGEMENT FRAMEWORK FOR MEDIATING ACCESS TO A RECONFIGURABLE PROCESSOR SYSTEM

RELATED APPLICATIONS AND DOCUMENTS

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, now U.S. Pat. No. 10,698,853 B1, filed Jan. 3, 2019, entitled "VIRTUALIZATION OF A RECONFIGURABLE DATA PROCESSOR;"
- U.S. Nonprovisional patent application Ser. No. 16/862,445, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 16/197,826, now U.S. Pat. No. 10,831,507 B2, filed Nov. 21, 2018, entitled "CONFIGURATION LOAD OF A RECONFIGURABLE DATA PROCESSOR;"
- U.S. Nonprovisional patent application Ser. No. 16/198,086, now U.S. Pat. No. 11,188,497 B2, filed Nov. 21, 2018, entitled "CONFIGURATION UNLOAD OF A RECONFIGURABLE DATA PROCESSOR;"
- U.S. Nonprovisional patent application Ser. No. 17/093,543, filed Nov. 9, 2020, entitled "EFFICIENT CONFIGURATION OF A RECONFIGURABLE DATA PROCESSOR;"
- U.S. Nonprovisional patent application Ser. No. 16/260,548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"
- U.S. Nonprovisional patent application Ser. No. 16/536,192, now U.S. Pat. No. 11,080,227 B2, filed Aug. 8, 2019, entitled "COMPILER FLOW LOGIC FOR RECONFIGURABLE ARCHITECTURES;"
- U.S. Nonprovisional patent application Ser. No. 17/326,128, filed May 20, 2021, entitled "COMPILER FLOW LOGIC FOR RECONFIGURABLE ARCHITECTURES;"
- U.S. Nonprovisional patent application Ser. No. 16/407,675, now U.S. Pat. No. 11,386,038 B2, filed May 9, 2019, entitled "CONTROL FLOW BARRIER AND RECONFIGURABLE DATA PROCESSOR;"
- U.S. Nonprovisional patent application Ser. No. 16/504,627, now U.S. Pat. No. 11,055,141 B2, filed Jul. 8, 2019, entitled "QUIESCE RECONFIGURABLE DATA PROCESSOR;"
- U.S. Nonprovisional patent application Ser. No. 17/322,697, filed May 17, 2021, entitled "QUIESCE RECONFIGURABLE DATA PROCESSOR;"
- U.S. Nonprovisional patent application Ser. No. 16/572,516, filed Sep. 16, 2019, entitled "EFFICIENT EXECUTION OF OPERATION UNIT GRAPHS ON RECONFIGURABLE ARCHITECTURES BASED ON USER SPECIFICATION;"
- U.S. Nonprovisional patent application Ser. No. 16/744,077, filed Jan. 15, 2020, entitled "COMPUTATIONALLY EFFICIENT SOFTMAX LOSS GRADIENT BACKPROPAGATION;"
- U.S. Nonprovisional patent application Ser. No. 16/590,058, now U.S. Pat. No. 11,327,713 B2, filed Oct. 1, 2019, entitled "COMPUTATION UNITS FOR FUNCTIONS BASED ON LOOKUP TABLES;"
- U.S. Nonprovisional patent application Ser. No. 16/695,138, now U.S. Pat. No. 11,328,038 B2, filed Nov. 25, 2019, entitled "COMPUTATIONAL UNITS FOR BATCH NORMALIZATION;"
- U.S. Nonprovisional patent application Ser. No. 16/688,069, filed Nov. 19, 2019, now U.S. Pat. No. 11,327,717 B2, entitled "LOOK-UP TABLE WITH INPUT OFFSETTING;"
- U.S. Nonprovisional patent application Ser. No. 16/718,094, filed Dec. 17, 2019, now U.S. Pat. No. 11,150,872 B2, entitled "COMPUTATIONAL UNITS FOR ELEMENT APPROXIMATION;"
- U.S. Nonprovisional patent application Ser. No. 16/560,057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"
- U.S. Nonprovisional patent application Ser. No. 16/572,527, now U.S. Pat. No. 11,410,027 B2, filed Sep. 16, 2019, entitled "Performance Estimation-Based Resource Allocation for Reconfigurable Architectures;"
- U.S. Nonprovisional patent application Ser. No. 15/930,381, now U.S. Pat. No. 11,250,105 B2, filed May 12, 2020, entitled "COMPUTATIONALLY EFFICIENT GENERAL MATRIX-MATRIX MULTIPLICATION (GEMM);"
- U.S. Nonprovisional patent application Ser. No. 17/337,080, now U.S. Pat. No. 11,328,209 B1, filed Jun. 2, 2021, entitled "MEMORY EFFICIENT DROPOUT;"
- U.S. Nonprovisional patent application Ser. No. 17/337,126, now U.S. Pat. No. 11,256,987 B1, filed Jun. 2, 2021, entitled "MEMORY EFFICIENT DROPOUT, WITH REORDERING OF DROPOUT MASK ELEMENTS;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 17/023,015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"
- U.S. Nonprovisional patent application Ser. No. 17/031,679, filed Sep. 24, 2020, entitled "SYSTEMS AND METHODS FOR MEMORY LAYOUT DETERMINATION AND CONFLICT RESOLUTION;"
- U.S. Nonprovisional patent application Ser. No. 17/175,289, now U.S. Pat. No. 11,126,574 B1, filed Feb. 12, 2021, entitled "INSTRUMENTATION PROFILING FOR RECONFIGURABLE PROCESSORS;"
- U.S. Nonprovisional patent application Ser. No. 17/371,049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922,975, filed Jul. 7, 2020, entitled "RUNTIME VIRTUALIZATION OF RECONFIGURABLE DATA FLOW RESOURCES;"

U.S. Nonprovisional patent application Ser. No. 16/996,666, filed Aug. 18, 2020, entitled "RUNTIME PATCHING OF CONFIGURATION FILES;"

U.S. Nonprovisional patent application Ser. No. 17/214,768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127,818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127,929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185,264, filed Feb. 25, 2021, entitled "TIME-MULTIPLEXED USE OF RECONFIGURABLE HARDWARE;"

U.S. Nonprovisional patent application Ser. No. 17/216,647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216,650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216,657, now U.S. Pat. No. 11,263,170 B1, filed Mar. 29, 2021, entitled "LOSSLESS TILING IN CONVOLUTION NETWORKS-PADDING BEFORE TILING, LOCATION-BASED TILING, AND ZEROING-OUT;"

U.S. Nonprovisional patent application Ser. No. 17/384,515, filed Jul. 23, 2021, entitled "LOSSLESS TILING IN CONVOLUTION NETWORKS-MATERIALIZATION OF TENSORS;"

U.S. Nonprovisional patent application Ser. No. 17/216,651, now U.S. Pat. No. 11,195,080 B1, filed Mar. 29, 2021, entitled "LOSSLESS TILING IN CONVOLUTION NETWORKS-TILING CONFIGURATION;"

U.S. Nonprovisional patent application Ser. No. 17/216,652, now U.S. Pat. No. 11,227,207 B1, filed Mar. 29, 2021, entitled "LOSSLESS TILING IN CONVOLUTION NETWORKS-SECTION BOUNDARIES;"

U.S. Nonprovisional patent application Ser. No. 17/216,654, now U.S. Pat. No. 11,250,061 B1, filed Mar. 29, 2021, entitled "LOSSLESS TILING IN CONVOLUTION NETWORKS-READ-MODIFY-WRITE IN BACKWARD PASS;"

U.S. Nonprovisional patent application Ser. No. 17/216,655, now U.S. Pat. No. 11,232,360 B1, filed Mar. 29, 2021, entitled "LOSSLESS TILING IN CONVOLUTION NETWORKS-WEIGHT GRADIENT CALCULATION;"

U.S. Nonprovisional patent application Ser. No. 17/364,110, filed Jun. 30, 2021, entitled "LOSSLESS TILING IN CONVOLUTION NETWORKS-TILING CONFIGURATION FOR A SEQUENCE OF SECTIONS OF A GRAPH;"

U.S. Nonprovisional patent application Ser. No. 17/364,129, filed Jun. 30, 2021, entitled "LOSSLESS TILING IN CONVOLUTION NETWORKS-TILING CONFIGURATION BETWEEN TWO SECTIONS;"

"U.S. Nonprovisional patent application Ser. No. 17/364,141, filed Jun. 30, 2021, entitled "LOSSLESS TILING IN CONVOLUTION NETWORKS-PADDING AND RE-TILLING AT SECTION BOUNDARIES;"

U.S. Nonprovisional patent application Ser. No. 17/384,507, filed Jul. 23, 2021, entitled "LOSSLESS TILING IN CONVOLUTION NETWORKS-BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397,241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216,509, now U.S. Pat. No. 11,191,182 B1, filed Mar. 29, 2021, entitled "UNIVERSAL RAIL KIT;"

U.S. Nonprovisional patent application Ser. No. 17/379,921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379,924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378,342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378,391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378,399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;"

U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a unified management framework, and more particularly, to a unified management framework for mediating access to an entity that interacts with a reconfigurable processor. Furthermore, the present technology relates to a system that includes a reconfigurable processor or a pool of many reconfigurable processors configured to execute a dataflow graph, an entity that provisions and deprovisions the dataflow graph on the reconfigurable processor and that controls execution of the dataflow graph on the reconfigurable processor, and a unified management framework for mediating access to the entity and to the reconfigurable processor, and to a method of operating a unified management framework for mediating access to an entity that interacts with a reconfigurable processor.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures.

A new approach is required to extract more useful work from current semiconductor technologies. Amplifying the gap between required and available computing is the explosion in the use of deep learning. According to a study by OpenAI, during the period between 2012 and 2020, the compute power used for notable artificial intelligence achievements has doubled every 3.4 months.

While the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

It is common for GPUs to be used for training and CPUs to be used for inference in machine learning systems based on their different characteristics. Many real-life systems demonstrate continual and sometimes unpredictable change, which means predictive accuracy of models declines without frequent updates.

Alternatively, reconfigurable processors, including FPGAs, can be configured to implement a variety of functions more efficiently or faster than might be achieved using a general-purpose processor executing a computer program.

Recently, so-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

Such reconfigurable processors, and especially CGRAs, are usually implemented as dataflow architectures and often include specialized hardware elements such as computing resources and device memory that operate in conjunction with one or more software elements such as a CPU and attached host memory in implementing user applications.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
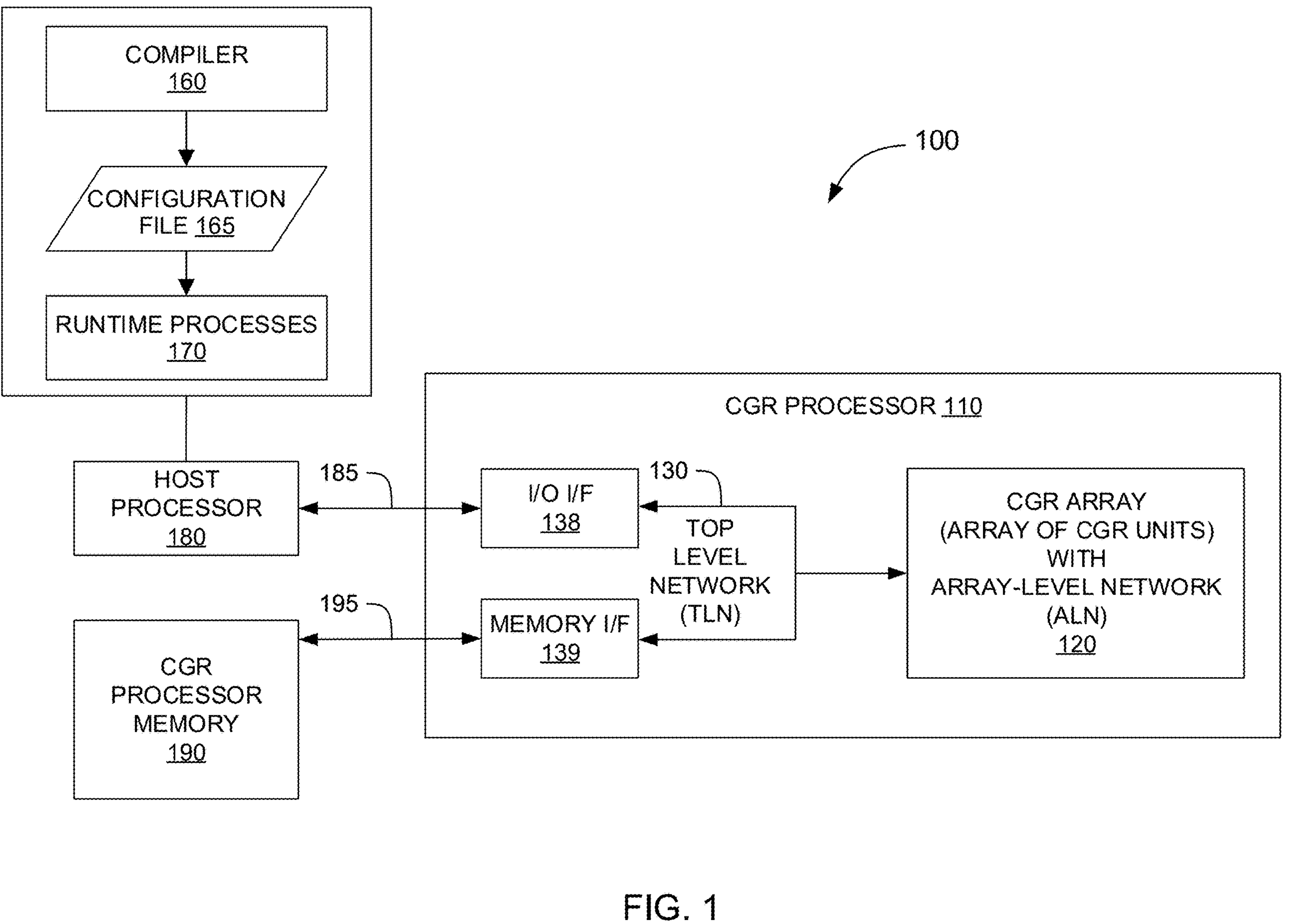
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUs).

As mentioned above, CGRAs are an extremely attractive platform when performance, power, or energy efficiency are paramount. A CGRA is usually a composition of coarse-grained reconfigurable compute and memory elements that are interconnected together in a certain topology using a reconfigurable interconnect fabric. It is referred to as coarse-grained reconfigurable because the reconfigurable components in the architecture operate at a coarser granularity such as instructions, words, and vectors of words, as opposed to fine-grained, bit-level granularity commonly found in architectures such as FPGAs. The programmable data and control paths in CGRAs make them a natural fit to exploit nested parallelism in applications, by connecting the reconfigurable compute and memory components into customized, deeply nested, and hierarchical pipelines.

Reconfigurable processors such as CGRAs are often complex and operate in conjunction with one or more software elements such as a host processor and attached host memory. The host processor typically provides a framework to orchestrate the management of configuration and execution of user applications on the reconfigurable processors. However, especially when providing access to a reconfigurable processor and the associated host processor in the cloud, users need to be provided with access to portions of the host processor and/or the reconfigurable processors while simultaneously being prevented from interacting with other portions of the host processor and/or the reconfigurable processors.

Therefore, it is desirable to provide a new framework for interaction with the host processor and/or the reconfigurable processors. Such a framework, which is hereinafter referred to as a unified management framework, should assist with, simplify, and improve the interaction with the host processor and/or the host operating system and/or the reconfigurable processor. In particular, the new unified management framework should mediate access to the host processor and/or to the reconfigurable processor.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes 170, as further referenced herein. In some implementations, host processor 180 may also be used to run computer programs, such as the compiler 160. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units in the CGR array 120, and to and from host processor 180 and attached CGR processor memory 190.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. Therefore, the configuration file is sometimes also referred to as a programming file.

A single configuration store may be at the level of the CGR processor 110 or the CGR array 120, or a CGR unit may include an individual configuration store. The configuration file 165 may include configuration data for the CGR array and CGR units in the CGR array, and link the computation graph to the CGR array. Execution of the configuration file by CGR processor 110 causes the CGR array(s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
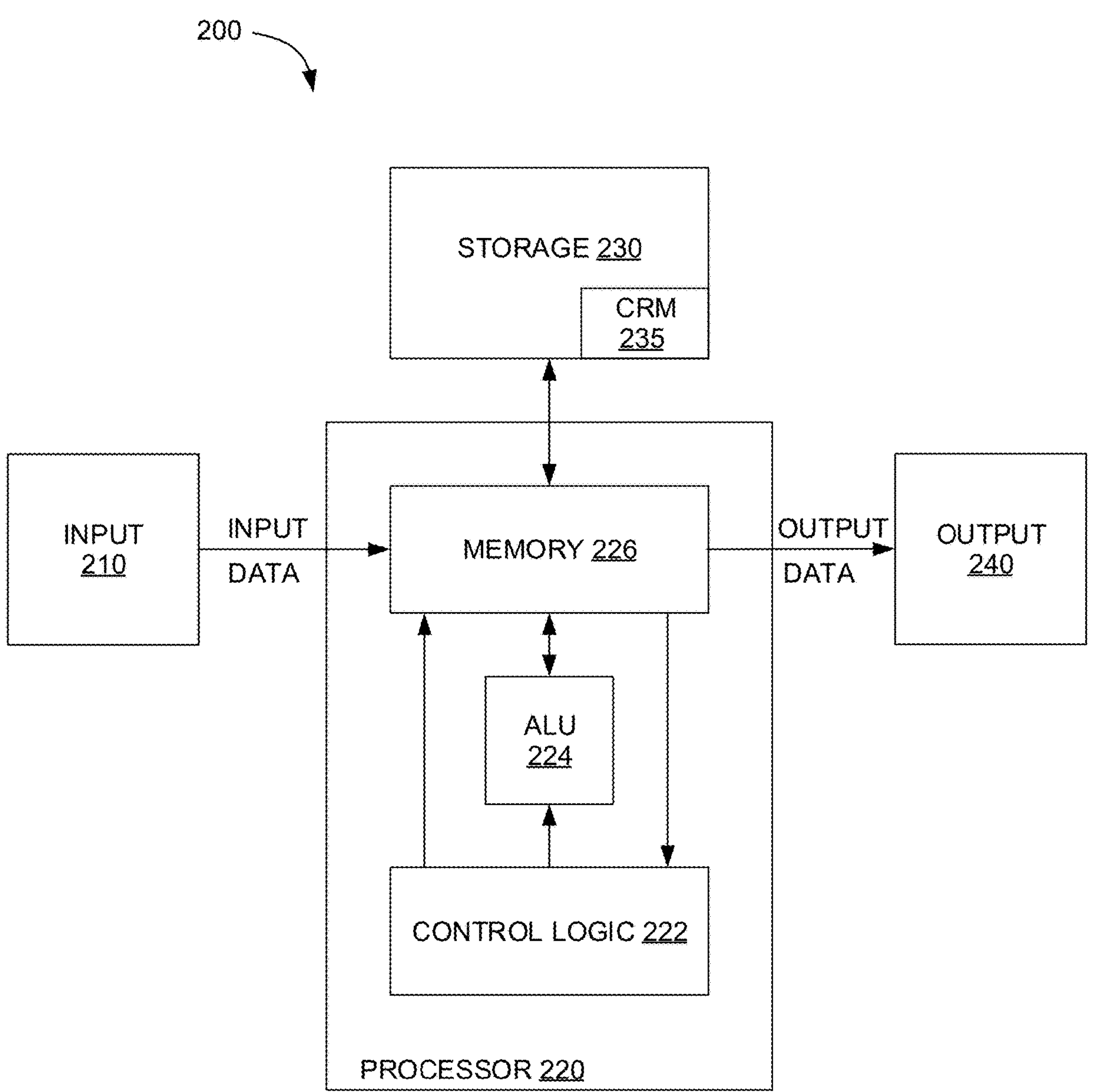
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM) 235, such as used for storing computer programs. The storage device 230 is sometimes also referred to as host memory.

Figure 3:
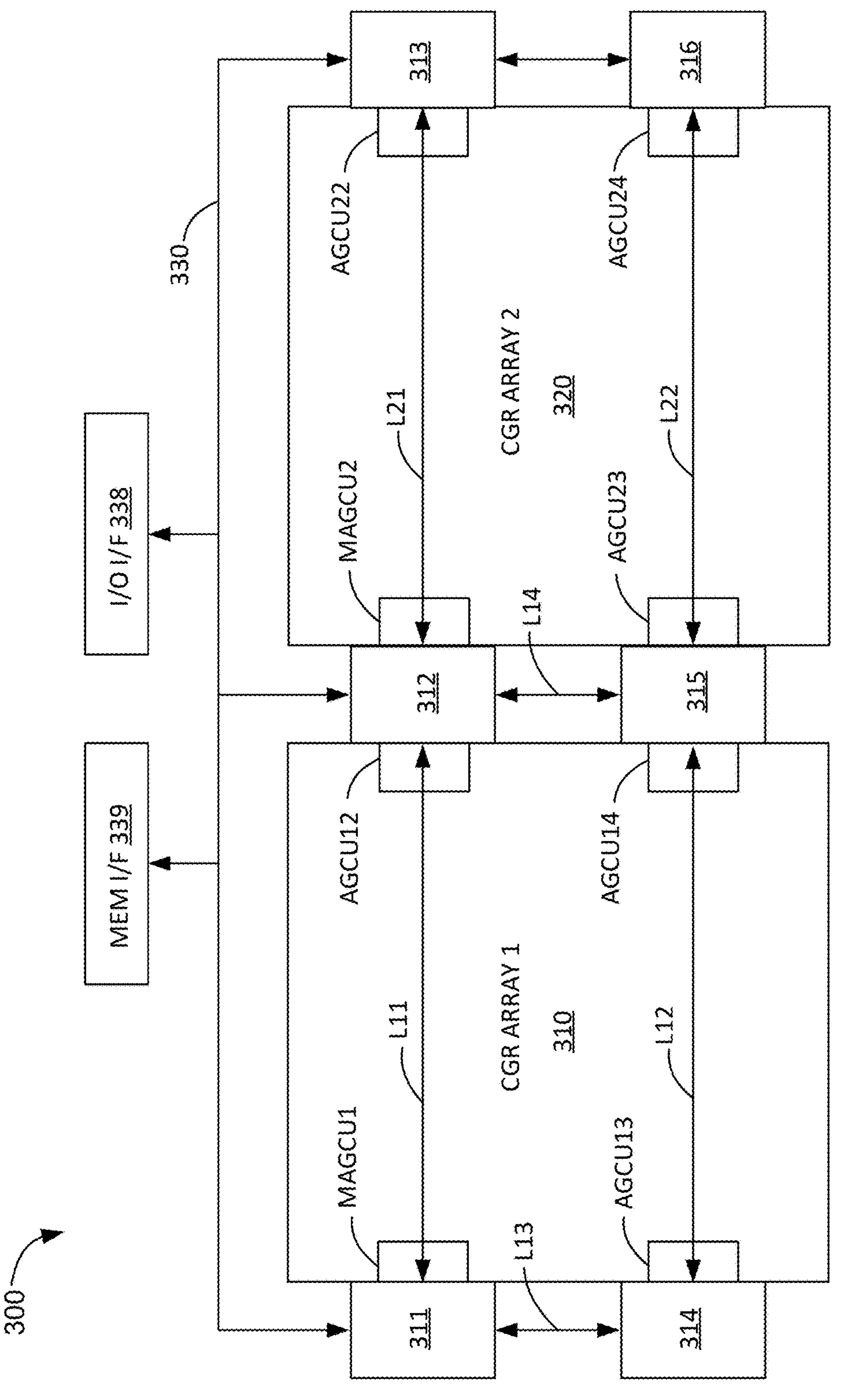
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320.

Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
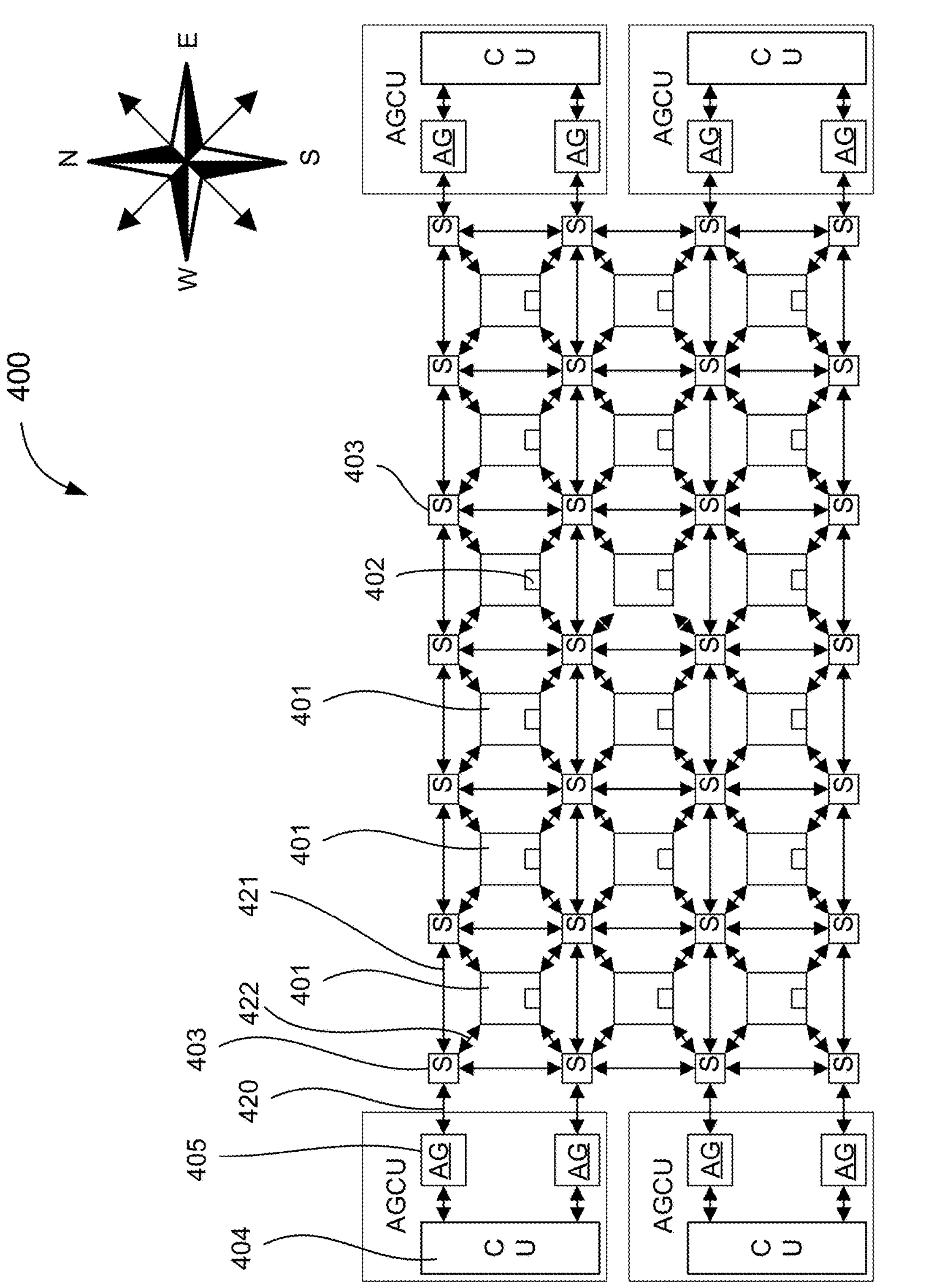
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada.

Illustratively, each CGR unit of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes 170, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., Northeast, Northwest, Southeast, Southwest, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
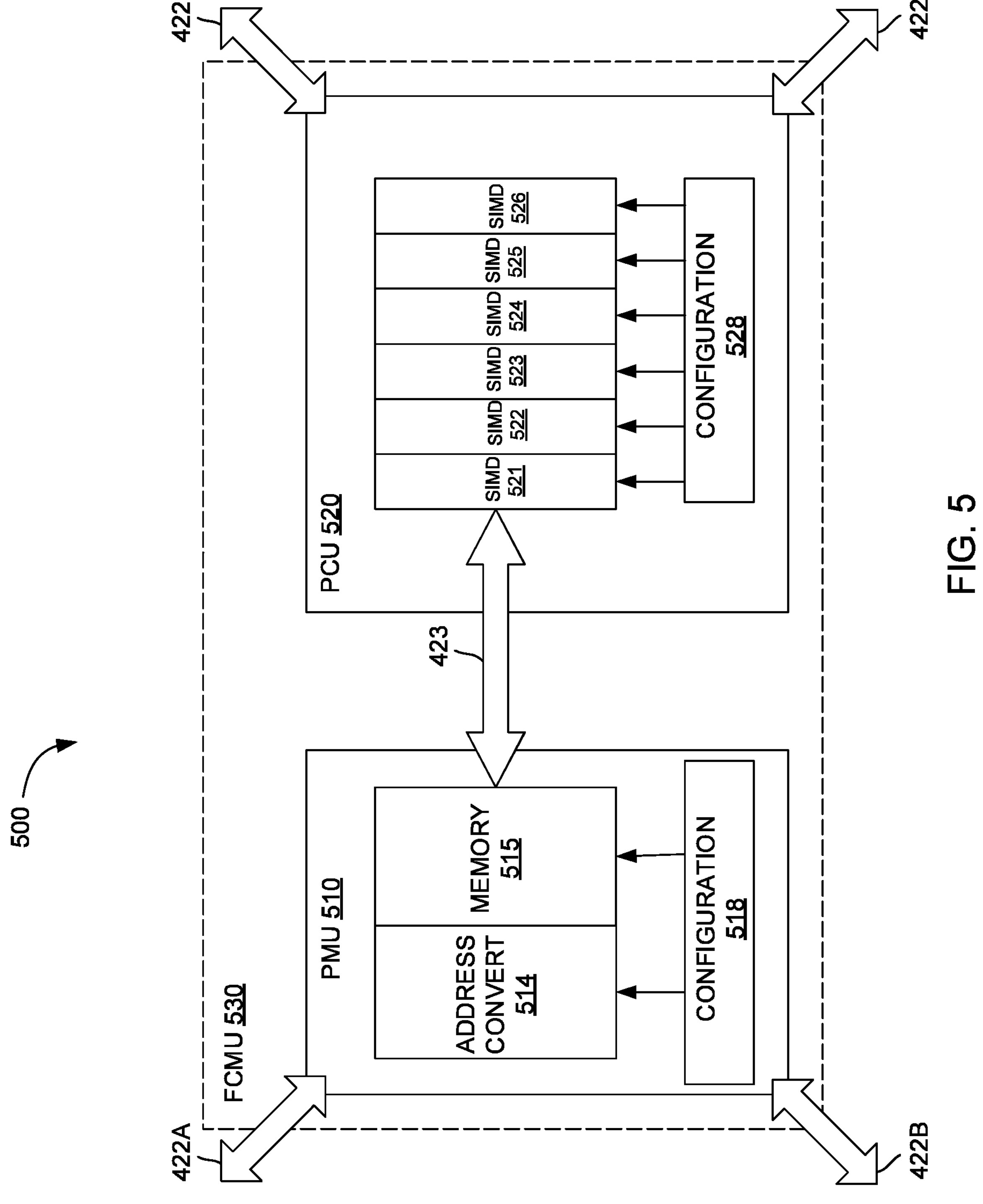
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. The FCMU 530 may include multiple ALN links, such as ALN link 423 that connects PMU 510 with PCU 520, northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D may connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. Configuration store 518 may be loaded, for example, from a program running on host processor 180 as shown in FIG. 1, and can configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as single-instruction multiple-data (SIMD) 521 through SIMD 526, and configuration store 528. The processor stages may include SIMDs, as drawn, or any other reconfigurable stages that can process data. PCU 520 may receive data through ALN links 422C-D, and/or 423, and process the data in the two or more processor stages or store the data in configuration store 528. PCU 520 may produce data in the two or more processor stages, and transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
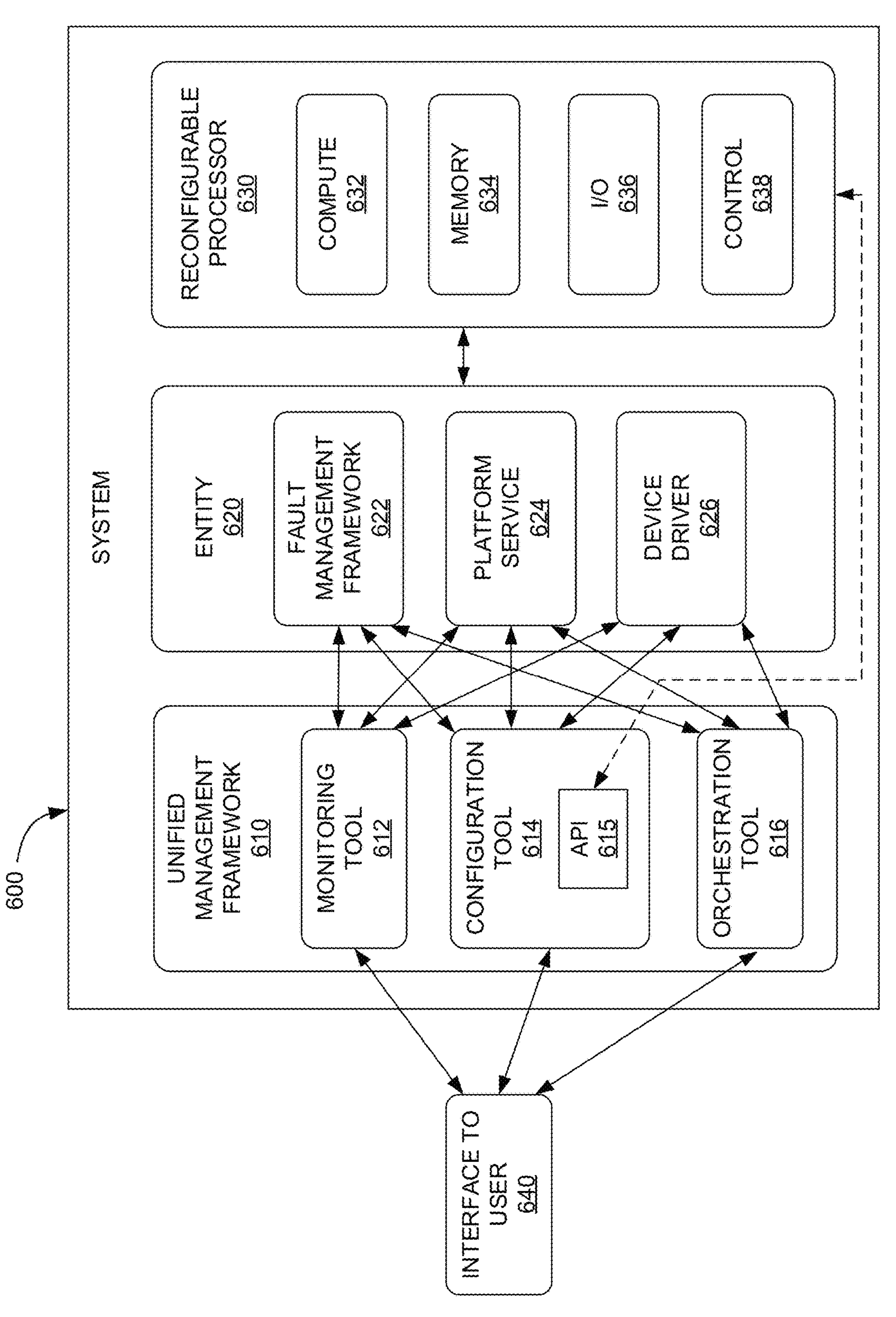
FIG. 6 is a diagram of an illustrative system including a unified management framework for mediating access to an entity that interacts with a reconfigurable processor.

FIG. 6 is a diagram of an illustrative system 600 including a reconfigurable processor 630 that is configured to execute a dataflow graph, an entity 620 that provisions and deprovisions the dataflow graph on the reconfigurable processor 630 and that controls execution of the dataflow graph on the reconfigurable processor 630, and a unified management framework 610 for mediating access to the entity 620 and to the reconfigurable processor 630.

Illustratively, the reconfigurable processor 630 may include several components that may be configured to execute the dataflow graph. For example, as shown in FIG. 6, the reconfigurable processor 630 may include a compute component 632, a memory component 634, an input-output (I/O) component 636, and a control component 638. Thus, when executing the dataflow graph, the compute component 632 may execute computational operations, the memory component 634 may store initial data, intermediate data, and results during the execution of the dataflow graph, while the I/O component 636 may receive input data and provide output data, and the control component 638 may, for example, control the routing of data between the compute component 632, the memory component 634, and the I/O component 636.

In some implementations, the reconfigurable processor 630 may have a CGR architecture such as CGR architecture 300 of FIG. 3. The CGR architecture may include one or more CGR arrays such as CGR array 400 of FIG. 4. If desired, the reconfigurable processor 630 may include a CGR processor such as CGR processor 110 of FIG. 1.

The entity 620 may include several components that interact with the reconfigurable processor 630 before, during, and after the execution of the dataflow graph on the reconfigurable processor 630. As shown in FIG. 6, the entity 620 may include a fault management framework 622, a platform service 624, and a device driver 626. If desired, the entity 620 may include additional components such as a command line interface (CLI), a statistics provider, a profiler and snapshot for debugging, a profile system, or a graph application frontend, just to name a few. In some implementations, the entity 620 may include a host processor such as host processor 180 of FIG. 1 with a compiler 160 and a runtime processor that executes runtime processes 170.

Illustratively, the fault management framework 622 may manage hardware faults and enable debugging of the reconfigurable processor 630. For example, the fault management framework 622 may diagnose faults that occur during the execution of the dataflow graph on the reconfigurable processor 630.

As shown in FIG. 6, the entity 620 may include a platform service 624 for managing a platform state. The graph application fronted may be responsible for defining a list of states representing the basic operations that can be grouped together to form an operation flow for a dataflow graph, for providing interfaces to read performance counters from the reconfigurable processor 630, for creating data structures of resources needed to execute a dataflow graph (e.g., number of CGR arrays or number of reconfigurable processors, memory segments, arguments, host FIFOs, etc.), and for configuring the reconfigurable processor 630 for executing the dataflow graph, for example by loading or provisioning and parsing of an execution file.

In some implementations, the entity 620 may include a device driver 626. The device driver 626 may manage host memory (e.g., memory associated with host processor 180 of FIG. 1) and device memory (e.g., on-chip and off-chip memory of the reconfigurable processor 630 such as memory on CGR processor 110 of FIG. 1 and CGR processor memory 190), provide efficient allocation/free functions for the dataflow graph and binary data (e.g., bit files, data, arguments, segments, symbols, etc.) in the execution file, handle data transfer requests between the entity 620 and the reconfigurable processor 630, provide APIs to transfer bit files, arguments, tensors, etc. from host memory to the device memory and from the device memory to the host memory through hardware supported methods like Direct Memory Access (DMA), memory-mapped file memory, and/or Remote Direct Memory Access (RDMA). If desired, the device driver 626 may create device nodes, interfaces with the reconfigurable processor 630 (e.g., by managing low level Peripheral Component Interface Express (PCIe) input/output operations and DMA buffers), and process hardware interrupts.

System 600 is shown in FIG. 6 with a single entity 620 that interacts with a single reconfigurable processor 630. However, system 600 may include a plurality of M entities and/or a plurality of N reconfigurable processors. In some implementations, each entity 620 of the M entities may interact with exactly one reconfigurable processor 630 (i.e., M is equal to N). In other implementations, an entity 620 may interact with more than one reconfigurable processor 630 (i.e., M is smaller than N). In yet other implementations, a single entity 620 may interact with a plurality of N reconfigurable processors (i.e., M is equal to one and N is greater than one).

As mentioned above, the unified management framework 610 in system 600 is adapted for mediating access to the entity 620 and to the reconfigurable processor 630. For this purpose, the unified management framework 610 is situated between a single unified user interface 640 and the entity 620 and controls access from the user interface 640 to the entity 620 and the reconfigurable processor 630. For example, the unified management framework 610 may provide a safe environment for a user for accessing the device driver 626 directly via the user interface 640.

As shown in FIG. 6, the unified management framework 610 includes a configuration tool 614, an orchestration tool 616, and a monitoring tool 612. The configuration tool 614 controls access to the entity 620 for provisioning and deprovisioning of the dataflow graph on the reconfigurable processor 630. For example, the configuration tool 614 may provide read or write access to settings of the entity 620 pertaining to the execution of the dataflow graph on the reconfigurable processor 630. If desired, the configuration tool 614 may manage the state of the reconfigurable processor 630, manage the fault management framework 622, and request that the entity 620 takes actions on components of the reconfigurable processor such as the compute component 632, the memory component 634, the I/O component 636, or the control component 638, for example via the platform service 624 or the device driver 626.

In some implementations, the configuration tool 614 may include an application programming interface (API) 615 that provides direct access to predetermined components of the reconfigurable processor 630, thereby bypassing the entity 620. Direct access in this context means access without enforcing any structure or validation of requested operations. For example, the API 615 may provide direct access to at least one of predetermined data structures on the entity 620, predetermined memory on the reconfigurable processor 630, or predetermined registers of the reconfigurable processor 630 for at least one of enabling design verification, enabling functional verification, marking diagnosed faults as cleared, or manually reporting faults or errors for diagnosis. Access to predetermined memory on the reconfigurable processor 630 or to predetermined registers of the reconfigurable processor 630 may enable users to directly manipulate the hardware state of a simulated or emulated chip or to reproduce unexpected situations for testing or debugging.

In some scenarios, the fault management framework 622 may have diagnosed a fault that a user believes to be unrelated to a real hardware issue of the reconfigurable processor 630. In these scenarios, access to predetermined data structures on the fault management framework 622 of the entity 620 and/or access to predetermined memory on the reconfigurable processor 630 and/or to predetermined registers of the reconfigurable processor 630 may enable the user to clear the fault. In other scenarios, a genuine hardware fault may not be diagnosed as such, and access to predetermined data structures on the fault management framework 622 of the entity 620 may enable to flag such a fault.

The orchestration tool 616 controls access to the entity 620 for controlling execution of the dataflow graph on the reconfigurable processor 630. Illustratively, the orchestration tool 616 may communicate with the fault management framework 622, the platform service 624, and the device driver 626 of the entity 620 for interacting with the reconfigurable processor 630.

If desired, the orchestration tool 616 may access the entity 620 for at least one of querying for hardware resources that are free to be used for the execution of the dataflow graph, creating and deleting reservations of hardware resources for the execution of the dataflow graph, or starting the execution of the dataflow graph on the reconfigurable processor 630.

Illustratively, the orchestration tool 616 provides data related to the scheduling and reservation of resources on the reconfigurable processor 630. For example, the orchestration tool 616 may provide data related to querying for hardware resources that are free to be used for the execution of a dataflow graph, data related to creating and deleting reservations of hardware resources for the execution of the dataflow graph, or data related to one of starting, stopping, or interrupting the execution of the dataflow graph on the reconfigurable processor 630.

In some implementation, the orchestration tool 616 may handle access to operations related to the execution of dataflow graphs on a reconfigurable processor 630 when the reconfigurable processor 630 is integrated into a data center with multiple other reconfigurable processors. For example, the orchestration tool 616 may query for the dataflow graphs that are actively using hardware resources, the hardware resources that are being used, creating and deleting reservations of hardware resources, and launching dataflow graphs or other operation on the reconfigurable processors in the data center. If desired, the orchestration tool 616 may allow job schedulers such as the Simple Linux Utility for Resource Management (SLURM) or the open-source container orchestration system Kubernetes to treat reconfigurable processors as schedulable hardware resources. For example, the unified management framework 610 can be advertised to Kubernetes or Simple Linux Utility for Resource Management (SLURM), or any other job orchestrator.

Illustratively, such a job scheduler may span an entire data center. If desired, the unified management framework 610 may be used for system health and status telemetry, which may be exported from each entity-reconfigurable processor tuple within a cluster through a central logging framework. In some implementations, the configuration tool 614 and the orchestration tool 616 of the unified management framework 610 may be used to dynamically create resource reservations in a reconfigurable processor 630, schedule jobs on resources, and inquire about the usability of resources, for example through modification of the scheduler or through a device plugin framework (e.g., in Kubernetes).

The monitoring tool 612 controls access to the entity 620 for monitoring the entity 620 and the reconfigurable processor 630 in connection with the execution of the dataflow graph on the reconfigurable processor 630. For example, the monitoring tool 612 may control access from the user interface 640 to the fault management framework 622, the platform service 624, and the device driver 626 of the entity 620.

Illustratively, the monitoring tool 616 may authorize access to configuration information, settings information, and status information of the entity 620 and/or of the reconfigurable processor 630. Illustratively, the monitoring tool 616 may determine the access time and the type of information that is accessed. For example, the monitoring tool 616 may authorize access to performance and utilization profiling data during the execution of the dataflow graph on the reconfigurable processor 630.

In some implementations, the monitoring tool 616 may access the platform service 624 for streaming the contents of hardware performance counters during the execution of dataflow graphs on the reconfigurable processor 630 for performance and utilization profiling, querying available resources and resource schedules, and access the fault management framework 622 for monitoring system health related telemetry. While a dataflow graph is executed on the reconfigurable processor 630, it may be useful to understand which hardware resources of compute component 632, IO component 636, or control component 638 are under most pressure. For the purpose of data center integration of the reconfigurable processor 630, a system administrator may use the monitoring tool 612 to supervise the components that are in use and monitor software or hardware health related events.

Illustratively, the unified management framework 610 provides a modular and flexible design. Thus, different kinds of requests from the user interface 640 may be serviced by the unified management framework 610. The various tools of the unified management framework 610 (i.e., the monitoring tool 612, the configuration tool 614, and the orchestration tool 616) may be language agnostic.

The unified management framework 610 may support remote management as well. For example, the user interface 640 may use sockets and standard TCP/IP network frameworks along with standard network security practices to allow remote administrators/users to log into the system 600 via the user interface 640 from anywhere, as long as the system 600 is attached to a network (e.g., to expose the unified management framework 610 across a data center network). This allows for more flexible remote management of the system 600, which is useful in a cloud or shared data center environment.

The unified management framework 610 may control access to the entity 620 and/or the reconfigurable processor 630 for pre- and post-silicon functional and design verification, during which users require elevated levels of privilege. For example, for low-level hardware debugging, direct access to specific hardware components such as configuration and status registers or device memory of the reconfigurable processor 630 may be required. However, such an access must be refused to non-trusted users. If desired, these services may be provided in a privileged section of the unified management framework 610. For example, the unified management framework 610 may enable read or write access to registers or to memory or to any other hardware that is in the privileged area of the reconfigurable processor 630.

Illustratively, the unified management framework 610 may serve as a building block for UNIX-style command line tools. For example, the unified management framework 610 may offer a multilingual and standardized way to interact with the entity 620. The APIs in the unified management framework 610 may provide access to the fault-management framework 622, requesting hardware resets, and managing configuration in the platform service 624.

In some implementations, the device driver 626, the platform service 624, and the fault management framework 622 of the entity 620 may be part of runtime code that runs on a host processor.

If desired, the unified management framework 610 may allow users to request via user interface 640 reconfigurable processor 630 as part of a container. The entity 620 and the unified management framework 610 may allow to reserve reconfigurable processor resources including compute components 632, memory components 634, and I/O components 636, and assign them to containers (or to processes within containers). In other words, the unified management framework 610 may allow to add reconfigurable processor 630 to the container, to remove reconfigurable processor 630 from the container, to reserve reconfigurable processor resources, and to assign the reconfigurable processor resources to processes inside a container.

In other implementations or in the same implementations but in a different execution mode, the entity 620 and the reconfigurable processor 630 are operating in concert with a host, and the unified management framework 610 operates on the host and mediates access from virtual machines to the host.

Figure 7:
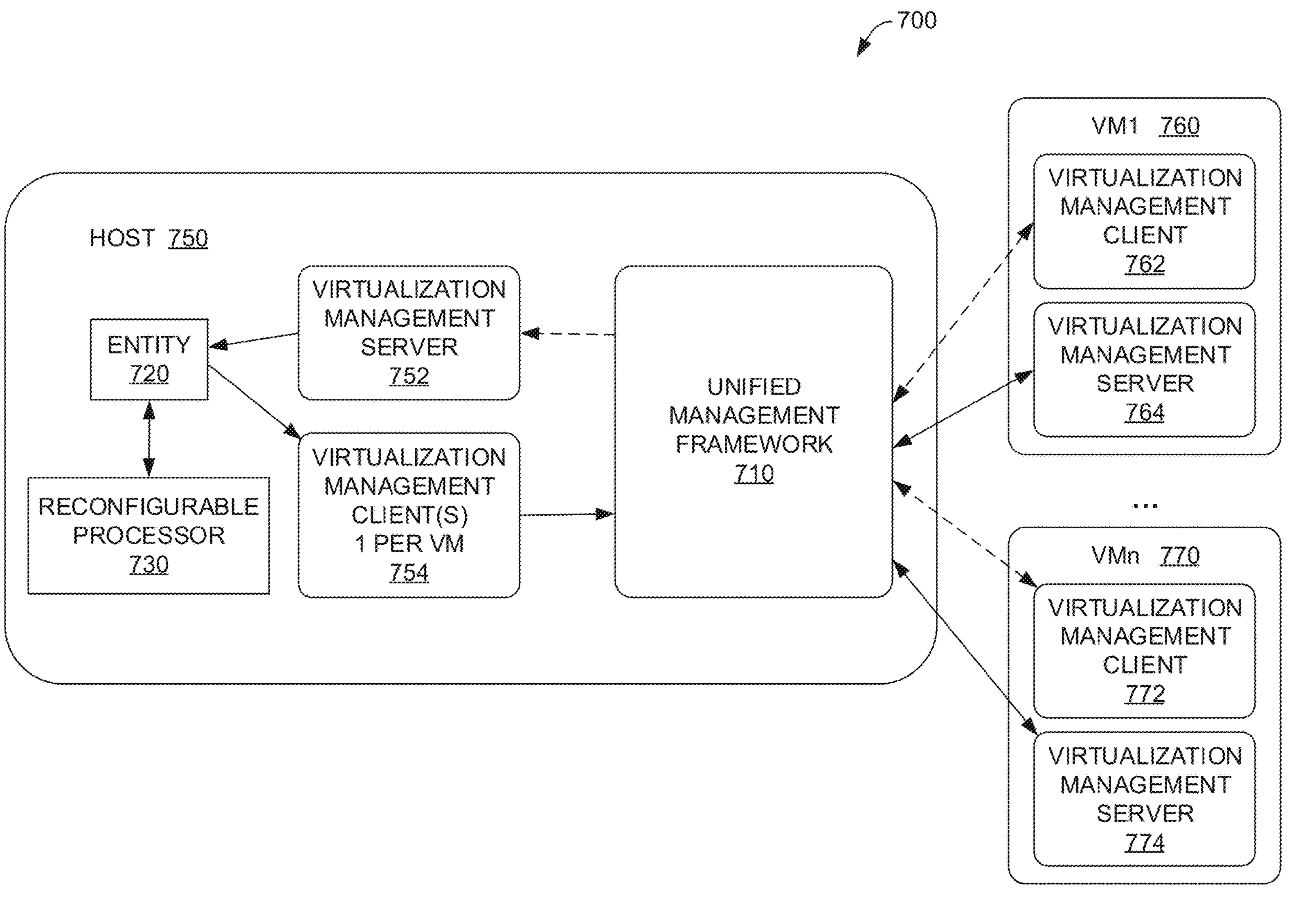
FIG. 7 is a diagram of an illustrative unified management framework that forms a communication interface between a host and virtual machines.

FIG. 7 is a diagram of a system 700 with an illustrative unified management framework 710 that operates on a host 750 and forms a communication interface between the host 750 and virtual machines (VM) 760, . . . , 770. As shown in FIG. 7, the unified management framework 710 creates a full-duplex communication channel between the host 750 and each VM of VM 760, . . . , VMn 770. The host 750 may include a reconfigurable processor 730, an entity 720 that interacts with the reconfigurable processor 730, as well as a server 752 and a client 754. In some implementations, the reconfigurable processor 730 may be separate from the host 750. The server 752 of the host 750 listens for requests from all VMs 760, . . . , 770. Each VM 760, . . . , 770 has one client 762, . . . , 772 for requesting the host 750 to take actions and one server 764, . . . , 774 for listening for requests from the host 750.

If desired, VM 760 and host 750 may each have a copy of the entire runtime library, and the copy or the runtime library that is executing in the VM 760 may be responsible for orchestrating the provisioning, execution, and deprovisioning of dataflow graphs on the reconfigurable processor 730 on the host 750. For example, a user may log into the VM 760 and use all of the existing system software APIs in the VM 760 to run their dataflow graph. In the scenario of an event (e.g., a memory error) happening in the VM 760, the copy of the runtime in the VM 760 would report this memory error to the host 750.

The dynamic creation, configuration, and destruction of the channels in the unified management framework 710 is managed by the entity 720 (e.g., platform service 624 of entity 620 of FIG. 6). The host 750 to VM 760, . . . , 770 communication channel through the unified management framework 710 can be provided by a variety of underlying physical transport mechanisms, including system sockets, TCP/IP, or proprietary transport built into accelerators implemented in reconfigurable processors. Thereby, an administrator of the system 700 can seamlessly manage any VMs 760, . . . , 770 that are derived from the system 700.

For example, the entity 720 on the host 750 may send and receive messages to the same entities in the VMs 760, . . . , 770. Sending and receiving messages to a VM is useful when the hardware, that is managed by a VM, experiences hardware errors or faults or performs an operation that requires orchestration from the host 750. In such a scenario, the VM 760, 770 can send a message to the host 750 for alerting the host 750 or for requesting that an action is taken.

As an example, consider the scenario in which the host 750 is implemented in a data center, and an application is running in VM 760 and experiences a memory error. The VM 760 may send a report of the memory error to the host 750 so that the data center management (i.e., the administrators) know that the hardware (e.g., reconfigurable processor 730), which is managed by the VM 760, encountered a hardware error. In return, the host 750 can request that the VM 760 reacts to the hardware error. For example, in the event that the host 750 has to go down to be live migrated or because the system needs to turn off, the host 750 can send a message to the VM 760 saying that any applications that are running in this VM 760 need to stop and make a checkpoint.

In some implementations, the unified management framework 710 may implement the same communication technology and exchange the same requests as the unified management framework 610 of FIG. 6, whereby the unified management framework 610 of FIG. 6 communicates via the TCP/IP stack.

In the example of FIG. 7, the unified management framework 710 may implement a Linux socket that is set up between the VMs 760, . . . 770 and the host 750. Illustratively, the entity 720 in the host 750 is requesting another entity in the VM 760, 770 to execute an operation or an entity in a VM 760, . . . , 770 may request entity 720 in host 750 to execute an operation, whereby the respective requests are being created by system software.

Figure 8:
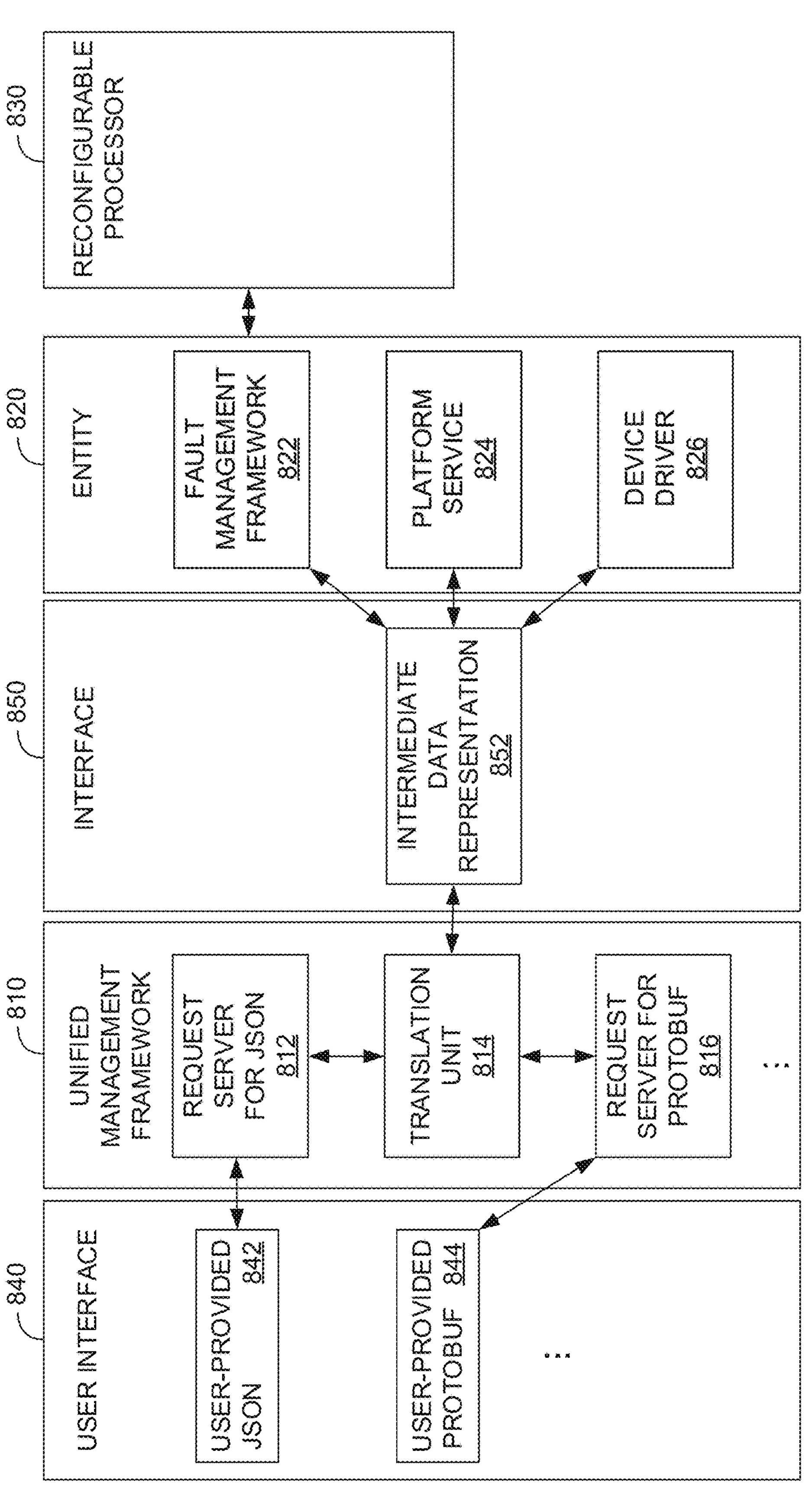
FIG. 8 is a diagram of illustrative communication paths between a user interface and a reconfigurable processor via a unified management framework.

FIG. 8 is a diagram of illustrative communication paths between a user interface 840 and a reconfigurable processor 830 via a unified management framework 810. Illustratively, the user interface 840 may be modular. For example, the user interface 840 may execute as a system service and listen for user requests via one or more common API server languages.

Consider the scenario in which a user creates a request in data serialized format JSON as a user-provided JSON request 842 or in data serialized format protobuf as a user-provided protobuf request 844 in the user interface 840. If desired, the user may create the request in another format such as a Python script, a command-line utility, or some other format. In this scenario, the user interface 840 may transmit the request to the appropriate request server in the unified management framework 810. Thus, the user interface 840 may transmit the user-provided JSON request 842 to the request server for JSON 812 and the user-provided protobuf request 844 to a request server for protobuf 816 in the unified management framework 810. If desired, the respective request servers in the unified management framework 810 may determine further action based on the user request.

The respective request server 812, 814 transmits the request to a translation unit 814. As shown in FIG. 8, the system includes an interface 850 between the unified management framework 810 and the entity 820, and the translation unit 814 may translate the request into an intermediate data representation 852 that is transmitted through the interface 850 to the entity 820. The intermediate data representation 852 may be both server agnostic and backend (i.e., entity 820) agnostic. The purpose of the intermediate data representation 852 is to provide compatibility between all of the input options including the server type (e.g., request server for JSON 812, request server for protobuf 816, etc.) and the input data format (e.g., JSON, protobuf, etc.), and the various backend components Including the fault management framework 822, the platform service 824, or the device driver 826 in the entity 820.

By way of example, the intermediate data representation 852 in interface 850 between the unified management framework 810 and the entity 820 facilitates the implementation of extensions to the unified management framework 810 so that the unified management framework 810 can handle various configuration or management requests.

Illustratively, the entity 820 may carry out the user's request or retrieve the relevant data from the reconfigurable processor 830, and the translation process happens in reverse with the results of the operation requested, the output data requested by the user, or both.

In the described scenario, the user could be system software inside a VM such as one of VMs 760, . . . , 770 of FIG. 7, the user could be a person that accesses user interface 640 of FIG. 6, or the user could be a container that is orchestrated by Kubernetes.

Figure 9:
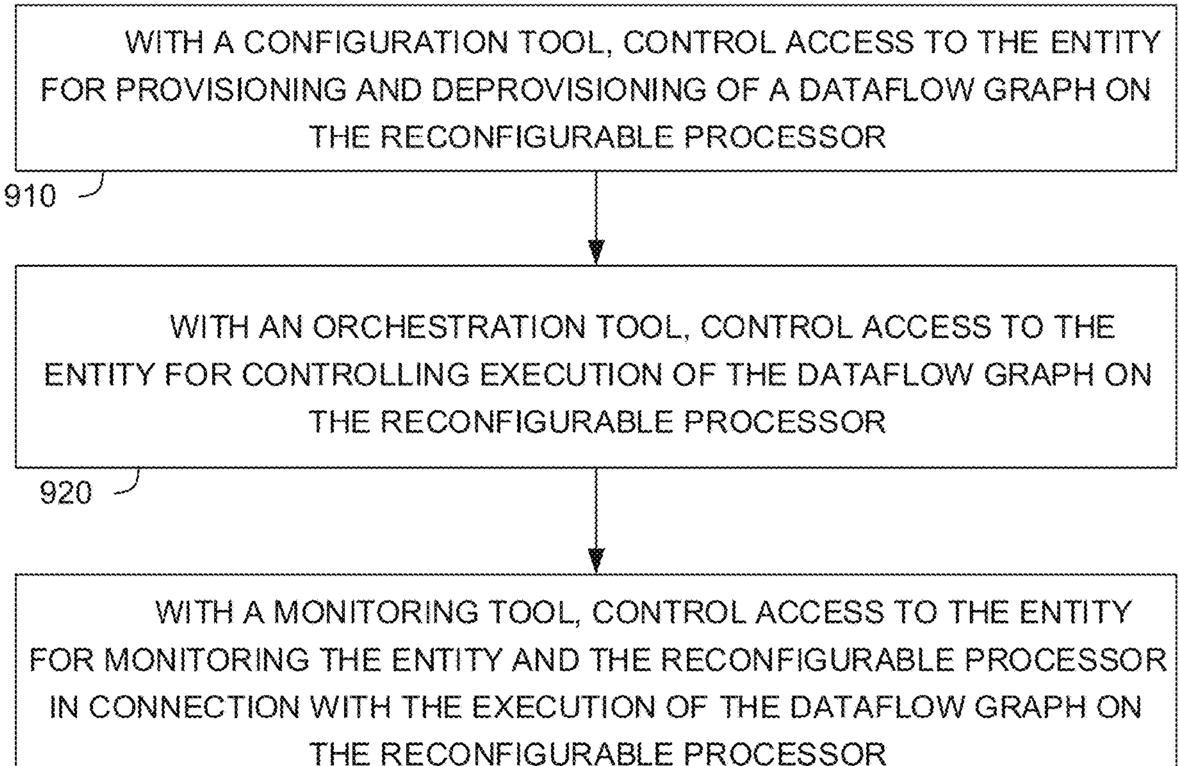
FIG. 9 is a flowchart showing illustrative operations that a unified management framework performs for mediating access to an entity that interacts with a reconfigurable processor.

FIG. 9 is a flowchart showing illustrative operations that a unified management framework (e.g., unified management framework 610 of FIG. 6) performs for mediating access to an entity (e.g., entity 620 of FIG. 6) that interacts with a reconfigurable processor (e.g., reconfigurable processor 630 of FIG. 6).

During operation 910, the unified management framework controls access to the entity for provisioning and deprovisioning of a dataflow graph on the reconfigurable processor with a configuration tool. For example, the configuration tool 614 of unified management framework 610 of FIG. 6 may control access to the entity 620 for provisioning and deprovisioning of a dataflow graph on the reconfigurable processor 630.

During operation 920, the unified management framework controls access to the entity for controlling execution of the dataflow graph on the reconfigurable processor with an orchestration tool. For example, the orchestration tool 616 of the unified management framework 610 of FIG. 6 may control access to the entity 620 for controlling execution of the dataflow graph on the reconfigurable processor 630.

During operation 930, the unified management framework controls access to the entity for monitoring the entity and the reconfigurable processor in connection with the execution of the dataflow graph on the reconfigurable processor with a monitoring tool. For example, the monitoring tool 612 of the unified management framework 610 of FIG. 6 may control access to the entity 620 for monitoring the entity 620 and the reconfigurable processor 630 in connection with the execution of the dataflow graph on the reconfigurable processor 630.

Illustratively, the monitoring tool may authorize access to configuration information, settings information, and status information of the entity and/or of the reconfigurable processor. For example, the monitoring tool 612 of FIG. 6 may authorize access to configuration information, settings information, and status information of the entity 620 and/or of the reconfigurable processor 630. The configuration information, the settings information, and the status information of the entity 620 and/or of the reconfigurable processor 630 may include configuration information of a dataflow graph that a user has compiled for implementation on the reconfigurable processor 630, settings information of the entity 620 and/or the reconfigurable processor 630 related to the execution of the dataflow graph of the user on the reconfigurable processor 630, and status information of the entity 620 and/or the reconfigurable processor 630 pertaining to the execution of the dataflow graph of the user on the reconfigurable processor 630.

However, the configuration information, the settings information, and the status information of the entity 620 and/or of the reconfigurable processor 630 may not include configuration information of another dataflow graph that another user has compiled for implementation on the reconfigurable processor 630, settings information of the entity 620 and/or the reconfigurable processor 630 related to the execution of the other dataflow graph of the other user on the reconfigurable processor 630, and status information of the entity 620 and/or the reconfigurable processor 630 pertaining to the execution of the other dataflow graph of the other user on the reconfigurable processor.

By way of example, the configuration tool may provide read or write access to settings of the entity pertaining to the execution of the dataflow graph on the reconfigurable processor. For example, the configuration tool 614 of FIG. 6 may provide read or write access to settings of the entity 620 pertaining to the execution of the dataflow graph on the reconfigurable processor 630.

In some implementations, the configuration tool may provide access to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis. For example, the configuration tool 614 of FIG. 6 may provide access to at least one of predetermined data structures on the entity 620, predetermined memory on the reconfigurable processor 630, or predetermined registers of the reconfigurable processor 630 for at least one of enabling design verification, enabling functional verification, marking diagnosed faults as cleared, or manually reporting faults or errors for diagnosis.

If desired, the orchestration tool may access the entity for at least one of querying for hardware resources that are free to be used for the execution of the dataflow graph, creating and deleting reservations of hardware resources for the execution of the dataflow graph, or starting the execution of the dataflow graph on the reconfigurable processor. For example, the orchestration tool 616 of FIG. 6 may access the entity 620 for at least one of querying for hardware resources that are free to be used for the execution of the dataflow graph, creating and deleting reservations of hardware resources for the execution of the dataflow graph, or starting the execution of the dataflow graph on the reconfigurable processor 630.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a unified management framework for mediating access to an entity that interacts with a reconfigurable processor, comprising: a configuration tool that controls access to the entity for provisioning and deprovisioning of a dataflow graph on the reconfigurable processor; an orchestration tool that controls access to the entity for controlling execution of the dataflow graph on the reconfigurable processor; and a monitoring tool that controls access to the entity for monitoring the entity and the reconfigurable processor in connection with the execution of the dataflow graph on the reconfigurable processor.

In Example 2, the monitoring tool of Example 1 further authorizes access to configuration information, settings information, and status information of the entity and/or of the reconfigurable processor.

In Example 3, the monitoring tool of Example 2 further authorizes access to performance and utilization profiling data during the execution of the dataflow graph on the reconfigurable processor.

In Example 4, the configuration tool of Example 1 provides read or write access to settings of the entity pertaining to the execution of the dataflow graph on the reconfigurable processor.

In Example 5, the configuration tool of Example 1 further comprises an application programming interface (API) that provides access to predetermined components of the reconfigurable processor.

In Example 6, the API of Example 5 provides access to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

In Example 7, the orchestration tool of Example 1 provides data related to the scheduling and reservation of resources on the reconfigurable processor.

In Example 8, the data related to the scheduling and reservation of resources on the reconfigurable processor of Example 7 comprises at least one of data related to querying for hardware resources that are free to be used for the execution of the dataflow graph, data related to creating and deleting reservations of hardware resources for the execution of the dataflow graph, or data related to one of starting, stopping, or interrupting the execution of the dataflow graph on the reconfigurable processor.

In Example 9, the unified management framework of Example 1 operates on a host and mediates access from virtual machines to the host.

In Example 10, the entity of Example 1 comprises a runtime processor with a device driver, a platform service for managing a platform state, and a fault management framework for diagnosing faults that occur during the execution of the dataflow graph on the reconfigurable processor.

Example 11 is a system comprising: a reconfigurable processor configured to execute a dataflow graph; an entity that provisions and deprovisions the dataflow graph on the reconfigurable processor and that controls execution of the dataflow graph on the reconfigurable processor; and a unified management framework for mediating access to the entity and to the reconfigurable processor, comprising: a configuration tool that controls access to the entity for provisioning and deprovisioning of the dataflow graph on the reconfigurable processor, an orchestration tool that controls access to the entity for controlling the execution of the dataflow graph on the reconfigurable processor, and a monitoring tool that controls access to the entity for monitoring the entity and the reconfigurable processor in connection with the execution of the dataflow graph on the reconfigurable processor.

In Example 12, the system of Example 11 further comprises an interface comprising an intermediate data representation between the unified management framework and the entity.

In Example 13, the entity of Example 11 further comprises a fault management framework for diagnosing faults that occur during the execution of the dataflow graph on the reconfigurable processor, and wherein the configuration tool provides access via the fault management framework to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

In Example 14, the monitoring tool of Example 11 further authorizes access to configuration information, settings information, and status information of the entity and/or of the reconfigurable processor.

In Example 15, the orchestration tool of Example 11 accesses the entity for at least one of querying for hardware resources that are free to be used for the execution of the dataflow graph, creating and deleting reservations of hardware resources for the execution of the dataflow graph, or starting the execution of the dataflow graph on the reconfigurable processor.

Example 16 is a method of operating a unified management framework for mediating access to an entity that interacts with a reconfigurable processor, comprising: with a configuration tool, controlling access to the entity for provisioning and deprovisioning of a dataflow graph on the reconfigurable processor; with an orchestration tool, controlling access to the entity for controlling execution of the dataflow graph on the reconfigurable processor; and with a monitoring tool, controlling access to the entity for monitoring the entity and the reconfigurable processor in connection with the execution of the dataflow graph on the reconfigurable processor.

In Example 17, the method of Example 16 further comprises with the monitoring tool, authorizing access to configuration information, settings information, and status information of the entity and/or of the reconfigurable processor.

In Example 18, the method of Example 16, further comprises with the configuration tool, providing read or write access to settings of the entity pertaining to the execution of the dataflow graph on the reconfigurable processor.

In Example 19, the method of Example 18 further comprises with the configuration tool, providing access to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

In Example 20, the method of Example 16 further comprises with the orchestration tool, accessing the entity for at least one of querying for hardware resources that are free to be used for the execution of the dataflow graph, creating and deleting reservations of hardware resources for the execution of the dataflow graph, or starting the execution of the dataflow graph on the reconfigurable processor.

What is claimed is:

1. A unified management framework for mediating access to an entity that interacts with a reconfigurable processor, comprising:

a configuration tool that controls access to the entity for provisioning and deprovisioning of a dataflow graph on the reconfigurable processor;

an orchestration tool that controls access to the entity for controlling execution of the dataflow graph on the reconfigurable processor; and a monitoring tool that controls access to the entity for monitoring the entity and the reconfigurable processor in connection with the execution of the dataflow graph on the reconfigurable processor.

2. The unified management framework of claim 1, wherein the monitoring tool further authorizes access to configuration information, settings information, and status information of the entity and/or of the reconfigurable processor.

3. The unified management framework of claim 2, wherein the monitoring tool further authorizes access to performance and utilization profiling data during the execution of the dataflow graph on the reconfigurable processor.

4. The unified management framework of claim 1, wherein the configuration tool provides read or write access to settings of the entity pertaining to the execution of the dataflow graph on the reconfigurable processor.

5. The unified management framework of claim 1, wherein the configuration tool further comprises:

an application programming interface (API) that provides access to predetermined components of the reconfigurable processor.

6. The unified management framework of claim 5, wherein the API provides access to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

7. The unified management framework of claim 1, wherein the orchestration tool provides data related to the scheduling and reservation of resources on the reconfigurable processor.

8. The unified management framework of claim 7, wherein the data related to the scheduling and reservation of resources on the reconfigurable processor comprises at least one of data related to querying for hardware resources that are free to be used for the execution of the dataflow graph, data related to creating and deleting reservations of hardware resources for the execution of the dataflow graph, or data related to one of starting, stopping, or interrupting the execution of the dataflow graph on the reconfigurable processor.

9. The unified management framework of claim 1, wherein the unified management framework operates on a host and mediates access from virtual machines to the host.

10. The unified management framework of claim 1, wherein the entity comprises a runtime processor with a device driver, a platform service for managing a platform state, and a fault management framework for diagnosing faults that occur during the execution of the dataflow graph on the reconfigurable processor.

11. A system comprising:

a reconfigurable processor configured to execute a dataflow graph;

an entity that provisions and deprovisions the dataflow graph on the reconfigurable processor and that controls execution of the dataflow graph on the reconfigurable processor; and a unified management framework for mediating access to the entity and to the reconfigurable processor, comprising:

a configuration tool that controls access to the entity for provisioning and deprovisioning of the dataflow graph on the reconfigurable processor, an orchestration tool that controls access to the entity for controlling the execution of the dataflow graph on the reconfigurable processor, and a monitoring tool that controls access to the entity for monitoring the entity and the reconfigurable processor in connection with the execution of the dataflow graph on the reconfigurable processor.

12. The system of claim 11, further comprising:

an interface comprising an intermediate data representation between the unified management framework and the entity.

13. The system of claim 11, wherein the entity further comprises:

a fault management framework for diagnosing faults that occur during the execution of the dataflow graph on the reconfigurable processor, and wherein the configuration tool provides access via the fault management framework to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

14. The system of claim 11, wherein the monitoring tool further authorizes access to configuration information, settings information, and status information of the entity and/or of the reconfigurable processor.

15. The system of claim 11, wherein the orchestration tool accesses the entity for at least one of querying for hardware resources that are free to be used for the execution of the dataflow graph, creating and deleting reservations of hardware resources for the execution of the dataflow graph, or starting the execution of the dataflow graph on the reconfigurable processor.

16. A method of operating a unified management framework for mediating access to an entity that interacts with a reconfigurable processor, comprising:

with a configuration tool, controlling access to the entity for provisioning and deprovisioning of a dataflow graph on the reconfigurable processor;

with an orchestration tool, controlling access to the entity for controlling execution of the dataflow graph on the reconfigurable processor; and with a monitoring tool, controlling access to the entity for monitoring the entity and the reconfigurable processor in connection with the execution of the dataflow graph on the reconfigurable processor.

17. The method of claim 16, further comprising:

with the monitoring tool, authorizing access to configuration information, settings information, and status information of the entity and/or of the reconfigurable processor.

18. The method of claim 16, further comprising:

with the configuration tool, providing read or write access to settings of the entity pertaining to the execution of the dataflow graph on the reconfigurable processor.

19. The method of claim 18, further comprising:

with the configuration tool, providing access to at least one of predetermined data structures on the entity, predetermined memory on the reconfigurable processor, or predetermined registers of the reconfigurable processor for at least one of enabling design verification, enabling functional verification, marking diagnosed faults as cleared, or manually reporting faults or errors for diagnosis.

20. The method of claim 16, further comprising:

with the orchestration tool, accessing the entity for at least one of querying for hardware resources that are free to be used for the execution of the dataflow graph, creating and deleting reservations of hardware resources for the execution of the dataflow graph, or starting the execution of the dataflow graph on the reconfigurable processor.

* * * * *